CHARLES R. GILBERT.
Improvement in Garden Tools.
No. 118,360. Patented Aug. 22, 1871.
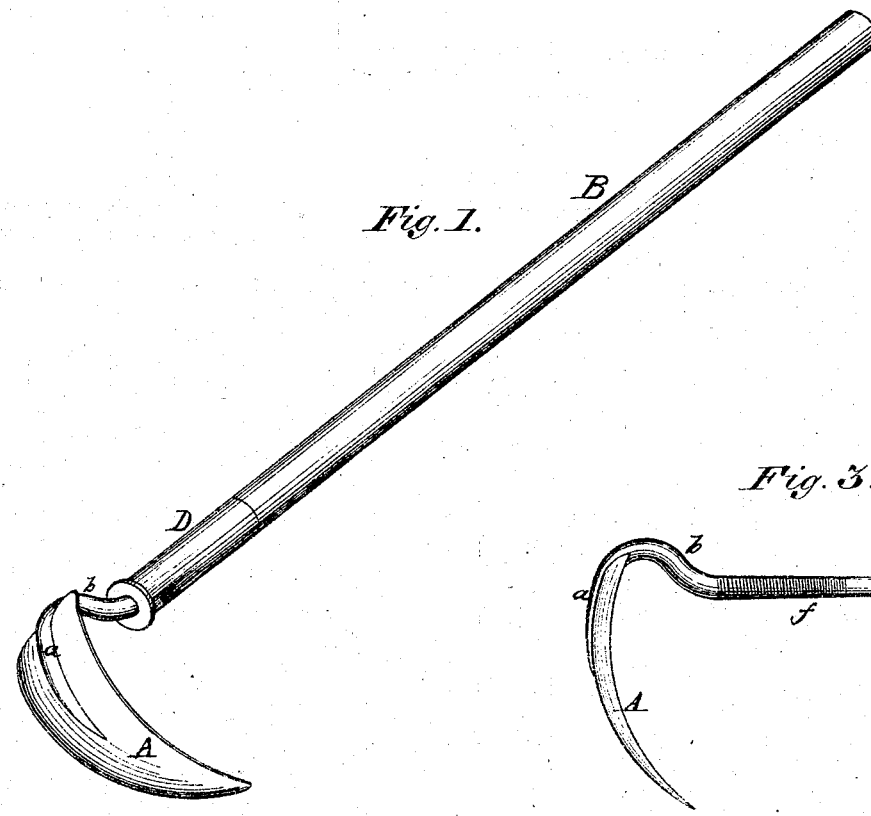
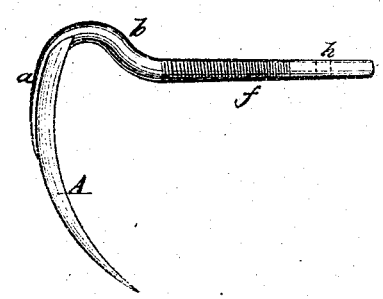
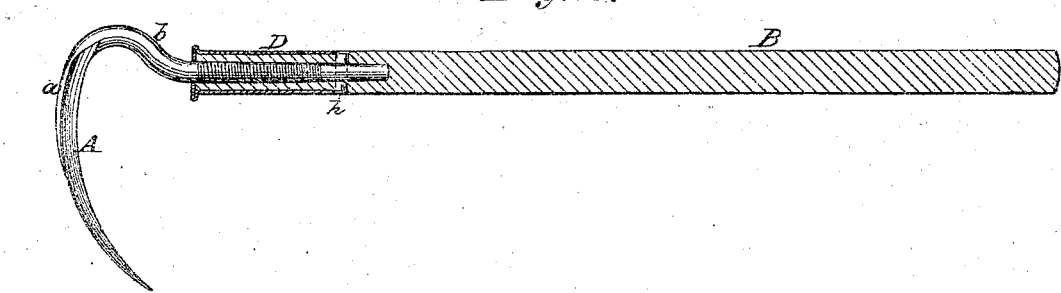
Witnesses:
N. S. Drake
D. L. Clark
Inventor:
Charles R. Gilbert

UNITED STATES PATENT OFFICE.

CHARLES R. GILBERT, OF HIGH POINT, NORTH CAROLINA.

IMPROVEMENT IN GARDEN-HOES.

Specification forming part of Letters Patent No. 118,360, dated August 22, 1871.

*To all whom it may concern:*

Be it known that I, CHARLES R. GILBERT, of High Point, of the county of Guilford and State of North Carolina, have made a new and useful Improvement in Garden-Hoes; and I hereby declare the following to be a full and exact description of the same, reference being had to the accompanying drawing, in which—

Figure 1 is a perspective view of my invention; Fig. 2 a, longitudinal section, and Fig. 3 a side elevation of the hoe.

My invention relates to certain modifications and improvements of the common garden-hoe which render it better suited for removing weeds, loosening the earth around the roots of plants, and for gardening-work in general.

The following description will enable any one skilled in the art to make my invention.

The blade of the hoe is of triangular form, shaped like a small shovel-plow, with a strengthening-rib, $a$, which is continued to form the shank $b$, which connects the hoe with the handle B. I prefer to make the shank $b$ with screw-threads $f$ on its upper portion, as shown in Figs. 2 and 3. The handle B has a ferrule, D. The socket in the end of the handle to receive the shank has counter screw-threads to match those on the shank. These counter-threads may be formed in the socket by the act of inserting the shank. The upper end of the shank should be provided with a hole, $h$, for the insertion of a rivet, key, or screw, so as to more firmly secure the hoe to the handle. The blade is broadest at the top and tapers gradually to the point. The cutting-edges extend on both sides from near the top to the point, and the blade is of the curved form shown in the drawing.

The rib $a$ and shank $b$ may be of one piece with the blade, or may be welded thereto or riveted. The blade may be made of sheet-steel or iron case-hardened, or of malleable cast-iron.

It will be readily seen that this hoe is well-suited for use in removing weeds from between and around growing vegetables. The point, being narrow, can be inserted between plants that are near to each other. By holding the upper end of the handle near the ground only the narrow part of the blade is used, and a narrow channel or furrow may be formed for seed or plants. By holding the upper end of the handle higher the broader part of the hoe strikes the ground, and in this position it may be conveniently used for skimming off weeds and grass in the cultivation of plants. The blade in the upper portion is sufficiently broad to be used for drawing earth or soil either to or from the plants.

Having thus described my invention, what I claim, and desire to secure by Letters Patent of the United States, is—

As a new article of manufacture herein described, a garden-hoe having a curved, triangular, tapering blade, and a shank so as to be attached to a handle, substantially in the manner set forth and described.

CHARLES R. GILBERT.

Witnesses:
 N. S. DRAKE,
 D. S. CLARK.